March 25, 1947. F. E. FREY 2,418,023
CATALYTIC RECONSTRUCTION OF HYDROCARBONS
Filed Nov. 26, 1943
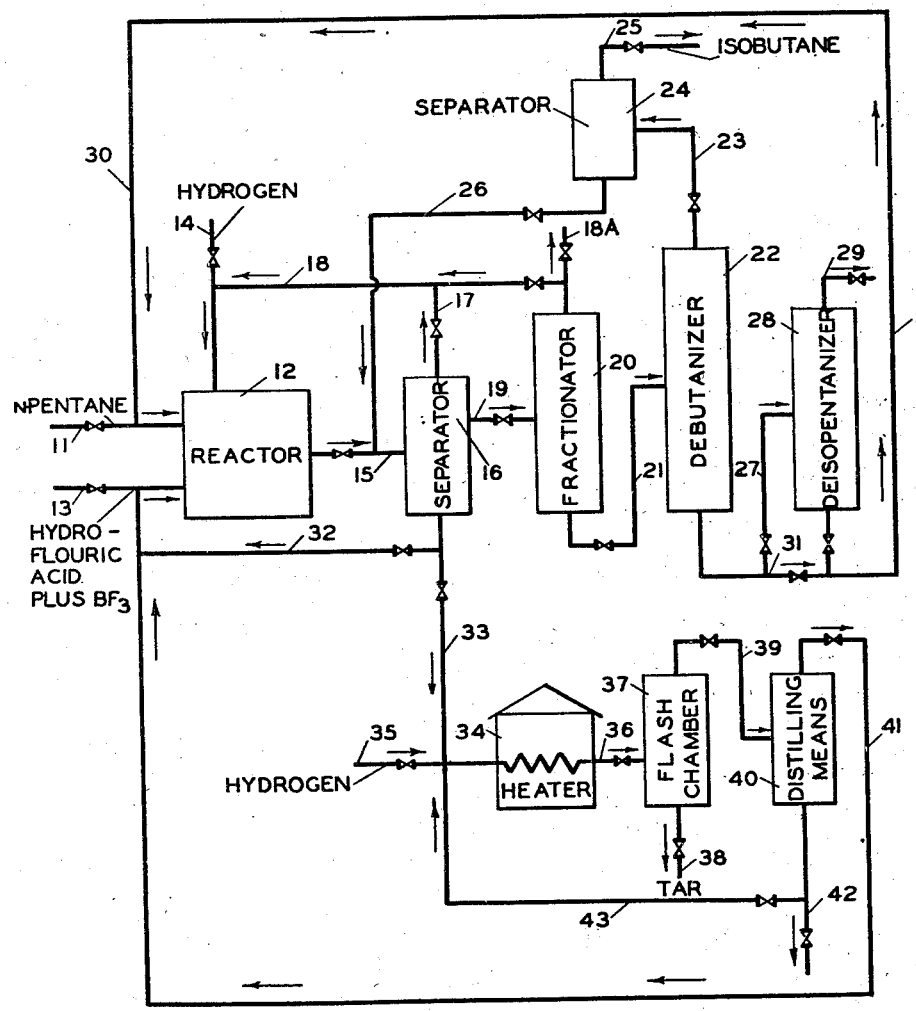
INVENTOR
FREDERICK E. FREY
BY Hudson, Young & Yinger
ATTORNEYS Patented Mar. 25, 1947

2,418,023

UNITED STATES PATENT OFFICE 2,418,023

CATALYTIC RECONSTRUCTION OF HYDROCARBONS

Frederick E. Frey, Bartlesville, Okla., assignor to Phillips Petroleum Company, a corporation of Delaware Application November 26, 1943, Serial No. 511,871

21 Claims. (Cl. 260—683.5)

This invention relates to a catalytic process for reconstructing hydrocarbons. More particularly, it relates to the use of free, or elementary, hydrogen to modify and direct catalytic reconstruction reactions of aliphatic hydrocarbons and/or to aid in regenerating hydrofluoric acid-containing catalysts used for such reactions. This application is a continuation-in-part of my copending application Serial No. 426,627, filed January 13, 1942, now U. S. Patent 2,403,649, issued July 9, 1946, and of my copending application Serial No. 460,867, filed October 5, 1942.

The first of the aforementioned copending applications discloses that in the presence of substantial proportions of hydrofluoric acid and under suitable conditions of time and temperature saturated hydrocarbons are reconstructed to hydrocarbons of different carbon-skeleton arrangement and different boiling point. Paraffinic hydrocarbons, for example, undergo conversion to isomers and to hydrocarbons of both lower and higher molecular weights and correspondingly lower and higher boiling temperatures. In the second copending application I have disclosed that a marked improvement in the efficiency and utility of concentrated hydrofluoric acid as a catalyst for reconstructing hydrocarbons is brought about by including with it a minor proportion of boron fluoride. I have now found that in the presence of catalysts which comprise hydrofluoric acid, with or without minor added proportions of boron fluoride, elementary hydrogen may react with aliphatic hydrocarbons; that elementary hydrogen has a directing influence on reconstructing reactions; that the presence of elementary hydrogen in reconstructing reactions increases the life of the catalyst; and that the presence of elementary hydrogen in steps for regenerating catalysts used for the reactions increases the efficiency of regeneration, especially of boron fluoride-containing catalysts.

It appears that, when hydrocarbons are subjected to conversion conditions in the presence of concentrated hydrofluoric acid as the essential or effective conversion catalyst, a number of reactions take place concurrently. When a paraffin hydrocarbon, alone, is converted the principal reactions are (1) simple isomerization and (2) an isoversion, or the formation of paraffins both of higher and of lower molecular weights. These reactions may be generally illustrated as follows:

(1) 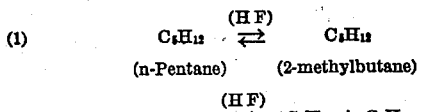
(n-Pentane)    (2-methylbutane)

(2) $2C_5H_{12} \underset{\text{(HF)}}{\rightleftarrows} C_4H_{10} + C_6H_{14}$

Reaction 2 will proceed with either normal pentane or isopentane, and the major amounts of the products will have a branched-chain structure. This reaction appears to be in somewhat marked contrast with reactions which take place in the presence of aluminum chloride. Although some isobutane can be produced from higher boiling paraffins in the presence of aluminum chloride, there does not appear to be so marked a formation of paraffins having molecular weights immediately higher than the paraffin reacted. Apparently the material which forms such paraffins when hydrofluoric acid is the catalyst is degraded to a sludge with aluminum chloride.

Olefin hydrocarbons also undergo various reactions, including one of naphthene formation. Likewise, cycloparaffin hydrocarbons undergo isomerization under similar conditions.

(3) 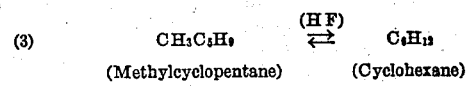
(Methylcyclopentane)    (Cyclohexane)

I have now found that, when free, or elementary, hydrogen is present in appreciable amounts, these reactions are affected in different degrees, so that by controlling the amount of hydrogen present I can control the conversion of the hydrocarbons to produce a product different from that produced with substantially the same extents of conversion but in the absence of hydrogen. In the presence of small concentrations of free hydrogen, such as hydrogen pressures up to about 200 pounds per square inch, reactions other than isomerization are markedly suppressed so that a conversion which is substantially straight-forward isomerization can be obtained. As the amount of hydrogen increases in this range, however, the reaction rate of the hydrocarbons converted appears to decrease somewhat, so that at the higher hydrogen pressures somewhat more drastic reaction conditions are necessary in order to obtain the same extent of conversion of the hydrocarbon charge stock. The decrease in reaction rate of the hydrocarbons charged continues as the hydrogen pressure is further increased, but another effect also comes in; the hydrogen actively enters into the reactions so that none of the original reactions is predominant but rather reactions involving a consumption of hydrogen appear. In the case of paraffin hydrocarbons there is some indication that the various reactions taking place result in products which can be represented, generally, in the following:

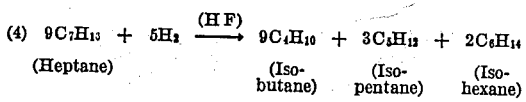

In any event, paraffin hydrocarbons, either straight- or branched-chain are converted to other paraffins which have lower molecular weights (and which are primarily branched-chain) and hydrogen is consumed.

When converting olefins in the presence of hydrogen, under high hydrogen pressures, an additional reaction involving addition of hydrogen to an olefinic linkage is involved. Thus, generally stated:

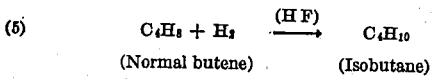

It is to be understood, of course, that the foregoing is a very general and theoretical discussion, and represents an attempt to explain, at least in part, the actual results which have been observed. It will be readily appreciated from the factual data presented hereinafter, that the actual reactions involved are not as simple, in all cases, as the general equations just presented.

As previously mentioned, the presence of hydrogen makes it necessary to have somewhat more drastic reaction conditions in order that the hydrocarbon charge will undergo conversion to the same extent. With a catalyst comprising solely hydrofluoric acid, or comprising hydrofluoric acid and a minor amount of boron trifluoride in fixed amounts, more drastic reaction conditions include higher temperatures and/or longer reaction times. With other conditions fixed, the addition of boron trifluoride to hydrofluoric acid, or an increase in its concentration, has a similar effect as an increase in reaction temperature and/or time, at least within ranges elsewhere herein discussed. However, it is not necessary, or desirable, to have the catalyst contain more than 8 to 10 per cent by weight of boron trifluoride, and an amount less than 8 per cent will generally be found to be satisfactory.

The present invention, in a specific embodiment, is directed primarily to the conversion of hydrocarbons in the presence of concentrated hydrofluoric acid as the effective or essential catalyst (either without or, and preferably, with boron trifluoride as discussed) in the presence of a sufficient amount of free hydrogen to enable the hydrogen to take part in the reaction and be consumed to an appreciable extent. Although, as is the case in connection with almost any other factor in chemical reactions, the differences between the effect of low hydrogen concentration and high hydrogen concentration have a tendency to merge from one to the other, it appears that a rather marked change occurs in the neighborhood of about 200 pounds per square inch of hydrogen pressure; above this pressure the hydrogen tends to become one of the definite reactants while below this pressure the primary effect of hydrogen is to suppress reactions other than isomerization, without actually being consumed to any marked extent. This latter feature is disclosed more thoroughly, and claimed, in my copending application Serial No. 511,872, filed November 26, 1943.

An object of this invention is to increase the yield of low-boiling hydrocarbons obtained in catalytic reconstruction processes. A specific object of this invention is to provide a process for converting normal pentane to isobutane in high yield. Another object of this invention is to increase the life of catalysts which comprise hydrofluoric acid and a minor proportion of boron fluoride. Another object of this invention is to increase the saturation of normally liquid gasoline-range hydrocarbons, such as are obtained from cracking processes. Other objects and advantages of the invention will become apparent, to one skilled in the art, from the following discussion and disclosure.

The present invention, broadly, comprises treating petroleum hydrocarbons with hydrogen in the presence of a catalyst which comprises concentrated, or substantially anhydrous, hydrofluoric acid as the major or even as the sole component. Preferably, however, a minor proportion of boron fluoride such as not in excess of about 8 or 10 per cent by weight, is included in the catalyst to increase its activity and to enable the reactions to proceed rapidly at relatively low temperatures. Preferably also, in order to aid and accelerate the reaction of hydrogen, a minor proportion of a hydrogen carrier such as a salt or halide of Cr, Sn, Cu, Ni, Co, Fe, Cd, Zn, Mo, V, or Pb, may be incorporated in the catalyst. One modification of the invention further comprises the step of heating spent or partially spent catalyst in the presence of hydrogen to regenerate active hydrofluoric acid and boron fluoride. In one specific embodiment of my invention which is particularly useful, a low boiling normally liquid hydrocarbon such as normal pentane, isopentane, or normal hexane is treated with hydrogen in the presence of hydrofluoric acid to which has been added a minor proportion of boron fluoride to produce relatively lower boiling hydrocarbons, particularly isobutane, as the major product. Another very useful embodiment of my invention comprises treating a mixture of saturated and unsaturated hydrocarbons boiling in the gasoline and/or kerosene range with hydrogen in the presence of concentrated hydrofluoric acid with or without catalyst modifiers, whereby complete saturation of the hydrocarbon mixture is attained without the loss of yield or volatility, resulting from alkylation, polymerization, etc., that may occur upon treatment with hydrofluoric acid in the absence of hydrogen. Indeed treatment in the presence of hydrogen in accordance with the principles of this invention may be used to effect an increase in volatility of such hydrocarbon materials.

In the practice of the invention isobutane is formed in much larger proportions than any other product and under controlled conditions may be obtained in ultimate yields of 60 mol per cent or more from hydrocarbons such as normal pentane, normal hexane, normal heptane, and/or isomers of these hydrocarbons. Normal butane may be isomerized to isobutane in the presence of elementary hydrogen and hydrofluoric acid to which a minor proportion of boron fluoride has been added. In isomerizing normal butane to isobutane, the presence of hydrogen does not appear to increase the ultimate yield of isobutane but it does appear to increase the life of the catalyst appreciably. It is also possible to obtain appreciable yields of isomers of other hydrocarbons. Olefins such as propylene, butylene, amylene or the like may also be included in the conversion stock and will undergo alkylation and conjunct polymerization while the paraffins so formed undergo fragmentation and recombination.

An understanding of the invention may be facilitated by referring to the accompanying drawing which is a schematic flow diagram of one arrangement of apparatus suitable for practicing the invention. For the sake of clarity and brevity the discussion hereinafter will be concerned mainly with the reconstruction of normal pentane to produce principally isobutane in the presence of elementary hydrogen and liquid substantially anhydrous hydrofluoric acid to which a minor proportion of boron fluoride has been added. It should be clearly understood, however, that the invention is applicable to other normally liquid saturated hydrocarbons and to olefins, and that it is especially useful for converting normal paraffins, which are of relatively low value, to isoparaffins, which are useful in the production of motor fuel ingredients having high antiknock ratings.

Normal pentane is admitted through inlet 11 to reactor 12, wherein it is agitated with concentrated hydrofluoric acid to which has been added a minor proportion of boron fluoride, which may be admitted through inlet 13, and hydrogen, which may be admitted through inlet 14. The proportion of boron fluoride may be in the range of about 0.1 to about 30 per cent by weight of the hydrofluoric acid; usually, less than about 10 per cent is highly satisfactory. A proportion in the range of about 1 to 5 per cent is usually preferred because such a composition is a very active hydrocarbon conversion catalyst at 50 to 350° F., yet the proportion of added boron fluoride is sufficiently low that the cost of replacing and/or regenerating the catalyst is not excessive. In general the proportion of boron fluoride may be correlated with the reaction temperature, the optimum proportion being somewhat higher with lower temperatures. In many instances it is desirable to add small amounts of boron fluoride at various times throughout the course of the reaction, as at a plurality of points along the length of a long reaction zone through which a stream of reactants is continuously passed. The catalyst may be completely anhydrous, or a small proportion of water can be present. The relative proportions of catalyst and hydrocarbon maintained in the intermingled condition in the zone of reaction are, within a wide range, not critical. Good results are obtained with hydrocarbon-catalyst ratios in the range of about 0.1:1 to 3:1 by weight, or more, and optimum results are obtained with ratios in the range of about 0.5:1 to 1.5:1. The reaction conditions should generally be such that the hydrofluoric acid catalyst is present in the reaction zone as a liquid.

The reaction temperature for converting normal pentane may be in the range of about 50 to 600° F. and preferably in the range of about 100 to 350° F. At such temperatures the reaction time, inversely dependent upon the temperature, may be in the range of about 5 minutes to several hours or more, but up to approximately 2 hours will generally be sufficient. In general, the optimum reaction temperature and time depend upon the hydrocarbon material being treated. A slightly higher temperature is required for ispentane and/or normal hexane than for normal pentane; the temperatures used for treating conversion stock containing olefins may be somewhat lower than those used for treating paraffins. Generally the time and temperature should be so correlated as to give at least about 30 to 50 per cent conversion per pass. If one is willing to accept a somewhat inferior product, that is, one which contains small proportions of propane or the like, the reaction may be carried out with conversions as high as 80 per cent per pass or more. The exact optimum conditions may be readily determined by trial for individual instances. As the catalysts and the reactant hydrocarbons are only slightly soluble in one another, especially at relatively low temperatures, it is desirable to provide a means of agitation in reactor 12, so that the hydrocarbons and catalyst are intimately admixed. The means for agitation may consist of stirrers, jet inlets, or baffles, or the reactor may be in the form of a tube of such dimensions that the flow of reaction mixture in it is turbulent. Rapid recirculation in a closed cycle with continuous introduction of charge and withdrawal of effluents may also be practiced.

The partial pressure of hydrogen in the reaction zone may be varied over a wide range, such as about 10 to about 5000 p. s. i., or more; preferably, in order to effect the hydrogenolysis, or hydroversion, which is an object of this invention, it should be at least about 200 p. s. i., and preferably 500 to 2000 p. s. i.

After a suitable time in reactor 12, the reaction mixture is passed through conduit 15 to separator 16, wherein by cooling and gravitational or centrifugal means it is separated into three phases. Gaseous hydrogen may be bled off from the top of separator 16 through conduit 17 and returned via conduit 18 to reactor 12. A liquid hydrocarbon phase is passed through conduit 19 to fractionator 20, wherein hydrogen is separated out by fractionation and is then returned through line 18 to reactor 12. If desired, light gases passed from fractionator 20 may be discharged, at least in part, through conduit 18A. Hydrocarbons from the kettle of fractionator 20 pass through conduit 21 to debutanizer 22. From debutanizer 22 a major overhead fraction, comprising principally isobutane with small amounts of hydrofluoric acid and sometimes propane, is passed through conduit 23 to separator 24, wherein it is separated into two liquid phases. The lighter or isobutane phase may be withdrawn through conduit 25. This isobutane is sufficiently pure for use as feed to an alkylation process; however, if desired it may be made substantially completely free of hydrogen fluoride by passing it over bauxite at an elevated temperature, by further distillation, by washing with an alkali, or the like, and/or it may be separated from hydrocarbon impurities by distillation, in steps not shown in the drawing. The heavier or hydrofluoric acid phase from separator 24, which is relatively minor in amount, is returned through conduit 26 to separator 16. The kettle fraction from debutanizer 22 comprises isopentane, unreacted normal pentane and small proportions of other hydrocarbons. This fraction is passed through conduit 27 to deisopentanizer 28 wherefrom isopentane may be withdrawn through outlet 29, and unreacted normal pentane and higher boiling hydrocarbons may be recycled through conduit 30 to reactor 12. If desired, this fraction may be first subjected to additional fractionation steps for recovering relatively high boiling isoparaffins such as isohexane and isoheptane. In some instances, it may be desirable to provide an additional fractionator, not shown in the drawing, to remove small proportions of normal butane. When adequate quantities of isopentane are available from other sources, it will be desirable to recycle the total kettle fraction from debutanizer 22 directly through conduits 31 and 30 to reactor 12; by this procedure isopentane reacts further to increase the ultimate yield of isobutane.

The heavier or catalyst phase from separator 16 may be recycled through conduit 32 to reactor 12. Preferably, however, a suitable portion of it is passed through conduit 33 to heater 34, wherein it is heated in the presence of hydrogen, admitted through inlet 35, to decompose organic fluorine and organic boron compounds. The temperature in heater 34 may be in the range of about 100 or 200 to about 800° F.; preferably it is in the range of about 350 to about 500° F. Although the catalyst may be regenerated in part by heating it in the absence of hydrogen, I have found that the regeneration is much more nearly complete if a partial pressure of hydrogen in the range, for example, of about 100 to 500 p. s. i. is used. The efficiency of regeneration may be still further increased by adding a minor proportion of a hydrogen carrier to the mixture prior to introduction into heater 34. The effluents from heater 34 pass through conduit 36 to flash chamber 37, wherein heavy carbonaceous materials or tar drop to the bottom as a semi-liquid phase and are removed through outlet 38, and hydrogen, hydrogen fluoride, boron fluoride, and other volatile fluorine and boron compounds are flashed overhead and are passed through conduit 39 to distilling means 40. Distilling means 40 effects a final separation by fractionation of regenerated hydrogen fluoride and boron fluoride from small proportions of oil, tar, and the like carried over from flash chamber 37. Hydrogen and regenerated hydrogen fluoride and boron fluoride are recycled from the top of distilling means 40 through conduit 41 to reactor 12, and oily material is withdrawn through conduit 42. If desired, part of this oily material may be recycled through conduit 43 to heater 34 in order to recover additional hydrogen fluoride and boron fluoride. When hydrogen carriers are used it may be desirable in some instances to recover them from the tar which is withdrawn through outlet 38 by means such as are well known to those skilled in the art. For example, the tar may be oxidized to remove organic material and the resulting ash may be reconverted to the original salt by suitable chemical treatment.

To illustrate further some of the many aspects of the invention, the following specific examples are given.

*Example I*

Two exploratory test runs were made to determine the influence of elementary hydrogen upon reconstruction of hydrocarbons in the presence of concentrated hydrofluoric acid as a catalyst. In run 1 hydrofluoric acid was introduced into a closed steel pressure vessel mounted on a mechanical shaker and equipped with an electrical heating element. The temperature was raised to 250° F., and sufficient hydrogen was introduced into the reactor to raise the total pressure to 1000 p. s. i. The shaker was started, and butene-1 was slowly introduced into the reactor. In run 2, about the same procedure and conditions were used except that the hydrogen was replaced by nitrogen. At the end of the reaction period, the acid and the hydrocarbon phases were withdrawn, separated, and examined. The following data were obtained.

| Run No. | 1 | 2 |
|---|---|---|
| Charge: | | |
| Hydrofluoric acid, lb. | 2.18 | 2.37 |
| Hydrogen pressure, p. s. i. | 1,000 | |
| Nitrogen pressure, p. s. i. | | 1,000 |
| Butene-1, lb. | 1.38 | 2.06 |
| Acid/olefin mol ratio | 4.0:1 | 3.2:1 |
| Average Temperature, °F. | 243 | 262 |
| Total reaction period, min. | 215 | 108 |
| Composition of Product, wt. %: | | |
| Propane | 0.96 | 0.2 |
| Isobutane | 34.59 | 20.1 |
| n-Butane | 13.51 | 4.9 |
| Pentanes | 20.28 | 15.1 |
| Heavier | 30.66 | 59.7 |
| Acid-Solubles in used acid, wt. % of used acid | 21.07 | 27.5 |

It appears from these data that the presence of elementary hydrogen in the reaction mixture increased the formation of low-boiling hydrocarbons, especially isobutane, and decreased the formation of high-boiling hydrocarbons. Also, it is evident that less acid-solubles was formed in the presence of hydrogen. Because of the exploratory nature of these runs, the conditions chosen were not optimum, resulting in the production of a relatively complex product. However, it appears that by the use of a somewhat higher temperature and/or by adding a minor proportion of a hydrogen carrier, such as a halide of a metal of the group consisting of Cr, Sn, Cu, Ni, Co, Fe, Cd, Zn Mo, V, and Pb, to the reaction mixture a very high yield of isobutane may be obtained from the reconstruction of olefins, in the presence of hydrofluoric acid and hydrogen.

*Example II*

A 400 cc. steel vessel, which could be shaken on a rocker arm, was charged with n-heptane, HF, BF₃, and hydrogen in the order given. Results are listed below.

| Run No. | 3 | | 4 | |
|---|---|---|---|---|
| | Gm. | Wt. % | Gm. | Wt. % |
| HF | 116 | 95.86 | 116 | 95.95 |
| BF₃ | 5.0 | 4.14 | 4.9 | 4.05 |
| n-Heptane, gm. | 83 | | 85 | |
| Hydrogen, p. s. i. | 0 | | 1,310 | |
| Time, min. | 20 | | 30 | |
| Temperature, °F. | 156 | | 162 | |
| Composition of effluents, per cent by weight: | | | | |
| Hydrogen | | | 0.02 | |
| Propane | 1.88 | | 8.81 | |
| Isobutane | 21.59 | | 37.50 | |
| n-Butane | 5.38 | | 9.44 | |
| Isopentane | 18.56 | | 19.41 | |
| n-Pentane | 2.88 | | 4.04 | |
| Neohexane | 3.88 | | 7.11 | |
| Diisopropyl | 1.63 | | 1.24 | |
| 2- and 3-methylpentane | 10.12 | | 6.20 | |
| n-Hexane | 1.33 | | 0.93 | |
| Isoheptane | 9.23 | | 4.08 | |
| n-Heptane | 14.71 | | 1.22 | |
| Octanes and heavier | 8.81 | | | |
| | 100.00 | | 100.00 | |
| Hydrogen/carbon ratio | 2.405:1 | | 2.460:1 | |

*Example III*

A steel vessel having a capacity of 350 cc. and equipped with a stirrer having blades revolving at 1750 R. P. M., inside of stationary blades to insure adequate mixing was charged with a paraffin hydrocarbon to be converted, hydrogen, hydrofluoric acid, and boron trifluoride, in that order, in the amounts and with the results shown in the following table.

| Run No. | 5 | | 6 | | 7 | | 8 | | 9 | | 10 | | 11 | | 12 | | 13 | |
|---|---|---|---|---|---|---|---|---|---|---|---|---|---|---|---|---|---|---|
| | Gm. | Wt. % | Gm. | Wt. % | Gm. | Wt. % | Gm. | Wt. % | Gm. | Wt. % | Gm. | Wt. % | Gm. | Wt. % | Gm. | Wt. % | Gm. | Wt. % |
| HF | 131 | 97.4 | 116 | 96.9 | 116 | 96.8 | 116 | 96.8 | 127 | 94.1 | 107 | 95.5 | 116 | 98.0 | 116 | 97.0 | 116 | 96.0 |
| BF₃ | 3.5 | 2.6 | 3.7 | 3.1 | 3.8 | 3.2 | 3.8 | 3.2 | 8.0 | 5.9 | 5.1 | 4.5 | 2.4 | 2.0 | 3.6 | 3.0 | 4.8 | 4.0 |
| Paraffin: | | | | | | | | | | | | | | | | | | |
| Identity | | | Normal Hexane | | | | | | 2-Methyl Pentane | | | | Normal Pentane | | | | | |
| Grams | 82 | | 82 | | 82 | | 82 | | 65 | | 65 | | 76 | | 76 | | 77 | |
| Hydrogen, p. s. i. | 0 | | 100 | | 25 | | 27 | | 0 | | 240 | | 0 | | 53 | | 1,085 | |
| Contact Time, Min. | 30 | | 90 | | 33 | | 10 | | 18 | | 20 | | 20 | | 30 | | 30 | |
| Temperature, °F | 178 | | 178 | | 176 | | 176 | | 129 | | 140 | | 165 | | 167 | | 176 | |
| Conversion of Paraffin, % | 88.8 | | Low | | 83.9 | | 57.7 | | | | | | 88.2 | | 24.4 | | Very low | |
| Composition of Effluent Hydrocarbon, Per cent by Weight: | | | | | | | | | | | | | | | | | | |
| Propane | 2.54 | | 96% | | 1.55 | | 0.38 | | 1.48 | | | | 0.86 | | | | 98% | |
| Isobutane | 25.16 | | Boiling | | 11.11 | | 2.19 | | 29.65 | | } 3.72 | | { 31.60 | | } 0.94 | | Boiling | |
| N-butane | 5.23 | | from | | 0.92 | | 0.25 | | 4.94 | | | | 5.64 | | | | from | |
| Isopentane | 18.37 | | 149 | | 15.39 | | 0.65 | | 19.40 | | 2.30 | | 20.43 | | 22.07 | | 91 | |
| N-pentane | 3.69 | | to | | 1.72 | | 0.94 | | 2.37 | | | | 11.80 | | 75.56 | | to | |
| Neohexane | 13.26 | | 158° F. | | 15.74 | | 6.23 | | 8.74 | | 3.09 | | 4.56 | | | | 104° F. | |
| Diisopropyl | 1.40 | | indicating | | 1.35 | | 9.21 | | 1.71 | | 16.16 | | 1.30 | | | | indicating | |
| Methylpentanes | 8.63 | | very low | | 19.65 | | 33.46 | | 10.13 | | 71.87 | | 11.00 | | } 1.43 | | very low | |
| N-hexane | 11.20 | | conversion | | 16.14 | | 42.29 | | 2.74 | | | | | | | | conversion | |
| Isopentane | 6.30 | | | | 9.80 | | 1.44 | | 6.92 | | 2.12 | | 6.08 | | | | | |
| N-heptane and heavier | 4.22 | | | | 6.63 | | 2.96 | | 11.92 | | 0.74 | | 6.73 | | | | | |
| | 100.00 | | | | 100.00 | | 100.00 | | 100.00 | | 100.00 | | 100.00 | | 100.00 | | | |

This invention is broadly applicable to the treatment of aliphatic hydrocarbons, and is particularly valuable for treating normally liquid paraffins and/or olefins. Many modifications of this invention will be obvious to those skilled in the art. Hence, it is not intended that mention herein of specific apparatus, materials, conditions, or purposes should unduly limit the scope of my invention. In the specific embodiments described, it is understood that additional equipment such as pumps, valves, coolers, fractionators, or the like, such as are well-known to those skilled in the art, may be used wherever needed or convenient.

I claim:

1. A process for the production of isobutane from a low-boiling olefin having at least four carbon atoms per molecule, which comprises subjecting such an olefin hydrocarbon to conversion conditions in the presence of and intimately admixed with liquid concentrated hydrofluoric acid as the effective catalyst with a hydrocarbon to catalyst ratio in the range of about 0.1:1 to about 3:1 by weight and in the presence of free hydrogen under a pressure of at least 200 pounds per square inch.

2. The process of claim 1 in which said low-boiling olefin is a normal butene.

3. The process of claim 1 in which the catalyst comprises between about 0.1 and about 10 per cent by weight of boron trifluoride.

4. The process of converting an olefinic hydrocarbon material to a more highly saturated hydrocarbon material, which comprises subjecting an olefinic hydrocarbon material to the action of a substantial amount of free hydrogen and in the presence of and intimately admixed with liquid concentrated hydrofluoric acid as the essential catalyst with a hydrocarbon to catalyst ratio in the range of about 0.1:1 to about 3:1 by weight under conversion conditions such that hydrocarbon effluents of said conversion are substantially free from olefin hydrocarbons.

5. The process of claim 4 in which the catalyst comprises between about 0.1 and about 10 per cent by weight of boron trifluoride.

6. A process for improving the activity of a partially spent liquid concentrated hydrofluoric acid catalyst which has been used in the conversion of hydrocarbons and which has become contaminated with organic impurities soluble therein, which comprises subjecting such a spent catalyst to an elevated temperature not greater than about 800° F. in the presence of free hydrogen under a partial pressure of at least 100 pounds per square inch and in the presence of a halide of a metal of the group consisting of chromium, tin, copper, nickel, cobalt, iron, cadmium, zinc, molybdenum, vanadium, and lead, for a time sufficient to effect a reaction of free hydrogen with said organic impurities, thereby effecting a purification of said liquid concentrated hydrofluoric acid catalyst.

7. The process of claim 6 in which said treatment is conducted at a temperature between about 350 and about 500° F.

8. The process of claim 6 in which said metal halide is a halide of chromium.

9. The process of claim 6 in which said metal halide is a halide of vanadium.

10. The process of claim 6 in which said metal halide is a halide of molybdenum.

11. A process for the conversion of a low-boiling paraffin hydrocarbon having at least five and not more than seven carbon atoms per molecule to lower-boiling paraffin hydrocarbons, which comprises reacting such a hydrocarbon at a reaction temperature between about 100 and about 350° F. while intimately admixed with a liquid catalyst comprising concentrated hydrofluoric acid as the essential catalyst and in the presence of a halide of a metal of the group consisting of chromium, tin, copper, nickel, cobalt, iron, cadmium, zinc, molybdenum, vanadium, and lead, with a hydrocarbon to catalyst ratio in the range of about 0.1:1 to about 3:1 by weight, and while associated with free hydrogen under a partial pressure between about 200 and about 5000 pounds per square inch for a time such as to effect a substantial extent of conversion of the paraffin hydrocarbon so treated.

12. The process of claim 11 in which said metal halide is a halide of vanadium.

13. A process for the conversion of a low-boiling paraffin hydrocarbon having at least five and not more than seven carbon atoms per molecule to lower-boiling paraffin hydrocarbons, which comprises reacting such a hydrocarbon at a reaction temperature between about 100 and about 350° F. while intimately admixed with a liquid catalyst comprising concentrated hydrofluoric acid as the essential catalyst together with between about 1 and about 8 per cent by weight of boron trifluoride and in the presence of a halide of a metal of the group consisting of chromium, tin, copper, nickel, cobalt, iron, cadmium, zinc, molybdenum, vanadium, and lead, with a hydrocarbon to catalyst ratio in the range of about 0.1:1 to about 3:1 by weight, and while associated with free hydrogen under a partial pressure between about 200 and about 5000 pounds per square inch for a time such as to effect a substantial extent of conversion of the paraffin hydrocarbon so treated.

14. A process for the conversion of a low-boiling aliphatic hydrocarbon having at least four carbon atoms per molecule to a different aliphatic hydrocarbon having a molecular weight not greater than the aliphatic hydrocarbon converted, which comprises subjecting such an aliphatic hydrocarbon to the catalytic action of and intimately admixed with liquid concentrated hydrofluoric acid and in the presence of a halide of a metal of the group consisting of chromium, tin, copper, nickel, cobalt, iron, cadmium, zinc, molybdenum, vanadium, and lead, with a hydrocarbon to catalyst ratio in the range of about 0.1:1 to about 3:1 by weight under conversion conditions and in the presence of a substantial amount of free hydrogen.

15. The process of claim 14 in which said metal halide is a halide of vanadium.

16. The process of claim 14 in which the liquid catalyst also contains between about 0.1 and about 10 per cent by weight of boron trifluoride.

17. A process for the conversion of a normal butene to isobutane, which comprises subjecting a normal butene to conversion conditions in the presence of and intimately admixed with liquid concentrated hydrofluoric acid as the effective catalyst and in the presence of a halide of a metal of the group consisting of chromium, tin, copper, nickel, cobalt, iron, cadmium, zinc, molybdenum, vanadium, and lead, with a hydrocarbon to catalyst ratio in the range of about 0.1:1 to about 3:1 by weight and in the presence of free hydrogen under a partial pressure of at least 200 pounds per square inch.

18. A process for the conversion of a low-boiling olefin to isobutane, which comprises subjecting a low-boiling olefin having at least four carbon atoms per molecule to conversion conditions in the presence of and intimately admixed with liquid concentrated hydrofluoric acid as the effective catalyst and in the presence of a halide of a metal of the group consisting of chromium, tin, copper, nickel, cobalt, iron, cadmium, zinc, molybdenum, vanadium, and lead, with a hydrocarbon to catalyst ratio in the range of about 0.1:1 to about 3:1 by weight and in the presence of free hydrogen under a partial pressure of at least 200 pounds per square inch.

19. The process of claim 18 in which the liquid catalyst also contains between about 0.1 and about 10 per cent by weight of boron trifluoride.

20. A process for the conversion of at least one paraffin hydrocarbon having at least five and not more than seven carbon atoms per molecule to lower-boiling paraffin hydrocarbons, which comprises reacting such a paraffin hydrocarbon at a reaction temperature between about 100 and about 350° F. while intimately admixed with a catalyst selected from the group consisting of liquid concentrated hydrofluoric acid, liquid concentrated hydrofluoric acid together with boron trifluoride in an amount between about 0.1 and about 8 per cent by weight of the total catalyst, and each of the aforesaid catalysts together with a halide of a metal of the group consisting of chromium, tin, copper, nickel, cobalt, iron, cadmium, zinc, molybdenum, vanadium, and lead, with a hydrocarbon to catalyst ratio in the range of about 0.1:1 to about 3:1 by weight and while associated with free hydrogen under a partial pressure between about 200 and about 5000 pounds per square inch for a time between about 5 minutes and about 2 hours and such as to effect a substantial extent of conversion of the paraffin hydrocarbon so treated to produce lower-boiling paraffin hydrocarbons, and recovering from effluents of said reaction a paraffinic hydrocarbon fraction containing a paraffin hydrocarbon so produced and lower-boiling than the paraffin hydrocarbon reacted.

21. A process for the conversion of a low-boiling aliphatic hydrocarbon having at least four and not more than seven carbon atoms per molecule to isobutane, which comprises reacting such an aliphatic hydrocarbon at a reaction temperature between about 100 and about 350° F. while intimately admixed with a catalyst selected from the group consisting of liquid concentrated hydrofluoric acid, liquid concentrated hydrofluoric acid together with boron-trifluoride in an amount between about 0.1 and about 8 per cent by weight of the total catalyst, and each of the aforesaid catalysts together with a halide of a metal of the group consisting of chromium, tin, copper, nickel, cobalt, iron, cadmium, zinc, molybdenum, vanadium, and lead, with a hydrocarbon to catalyst ratio in the range of about 0.1:1 to about 3:1 by weight and while associated with free hydrogen under a partial pressure between about 200 and about 5000 pounds per square inch for a time between about 5 minutes and about 2 hours and such as to effect a substantial extent of conversion of said aliphatic hydrocarbon to isobutane, and recovering from effluents of said reaction a hydrocarbon fraction comprising isobutane so produced.

FREDERICK E. FREY.

REFERENCES CITED

The following references are of record in the file of this patent:

UNITED STATES PATENTS

| Number | Name | Date |
|---|---|---|
| 1,843,880 | Lewis et al. | Feb. 2, 1932 |
| 2,172,146 | Ruthruff | Sept. 5, 1939 |
| 2,216,221 | Bartlett | Oct. 1, 1940 |
| 2,271,043 | van Peski | Jan. 27, 1942 |
| 2,293,891 | Evering et al. | Aug. 25, 1942 |
| 2,357,495 | Bloch | Sept. 5, 1944 |

OTHER REFERENCES

Simons, "Potential Use—Chemical Processes" Ind. and Eng. Chem. 32, 181 (Feb. 1940), 1 page.